United States Patent [19]

Clamen et al.

[11] Patent Number: 6,048,915

[45] Date of Patent: Apr. 11, 2000

[54] FAST DRYING TRAFFIC PAINTS

[75] Inventors: Guy Joseph Germain Clamen, Opio, France; Josef Hans Jilek, II, Viennal, Austria; Angelo Sanfilippo; Andrew Paul Trapani, both of Valbonne, France

[73] Assignee: Rohm and Haas Company, Philadelphia, Pa.

[21] Appl. No.: 08/261,514

[22] Filed: Jun. 17, 1994

[30] Foreign Application Priority Data

Jun. 17, 1993 [GB] United Kingdom .................... 9312482

[51] Int. Cl.⁷ .............................. F21V 7/22; C08L 33/00; C09D 5/00; C09D 133/00

[52] U.S. Cl. ............................................ 523/172; 524/556

[58] Field of Search ............................. 523/172; 524/523, 524/556

[56] References Cited

U.S. PATENT DOCUMENTS

| | | | |
|---|---|---|---|
| 3,480,577 | 11/1969 | Hallstrom et al. | 523/172 |
| 4,088,633 | 5/1978 | Gurney | 528/99 |
| 4,296,006 | 10/1981 | Bugdahl et al. | 523/172 |
| 4,318,959 | 3/1982 | Evans et al. | 524/507 |
| 4,792,357 | 12/1988 | Bier | 524/444 |
| 4,797,432 | 1/1989 | Cavitt | 523/172 |

FOREIGN PATENT DOCUMENTS

| | | |
|---|---|---|
| 525977 | 2/1993 | European Pat. Off. . |
| 57-35144 | 7/1982 | Japan . |
| 170478 | 1/1987 | Japan . |
| 179978 | 1/1987 | Japan . |

*Primary Examiner*—Peter A. Szekely
*Attorney, Agent, or Firm*—Ronald D. Bakule

[57] ABSTRACT

A fast drying traffic paint which includes at least 0.1% by weight, based on the weight of the paint composition, of fibers is disclosed. The paint exhibits reduced cracking during drying.

A method for reducing the degree of surface cracking in a fast drying traffic paint during drying is also disclosed. The method comprises incorporating into the paint at least 0.1% by weight, based on the weight of the paint composition, of fibers.

Use of at least 0.1% by weight, based on the weight of the paint composition, of fibers in a fast drying traffic paint to reduce the degree of surface cracking during drying of the paint is also disclosed.

1 Claim, No Drawings

FAST DRYING TRAFFIC PAINTS

This invention concerns fast drying traffic (road marking) paints. Modern traffic paints are designed to dry rapidly at their surface, so that vehicles can drive across the paint only a few minutes after its application without picking any up on their tyres.

Relatively thick paint applications (thicker when wet than about 450 microns) of fast drying paint tend to suffer from 'mud-cracking', which is the formation of cracks or channels within the paint film as it dries. The mud-cracking is believed to occur because the surface of the paint dries first, and then as the rest of the paint dries, it shrinks. The cracks have detrimental affects on the performance of the paints as road markings, particularly with regard to dirt retention and the consequent reduction in daylight visibility of the paint.

A fast drying paint normally has a dry-through time of less than 120 minutes when the climatic conditions are 23° C., no air flow and 90% relative humidity. Dry-through is defined by ASTM D-1640-83 with the modification that no thumb pressure is exerted.

One known way to help reduce the mud-cracking is to add larger particulate fillers, such as quartz or silica particles. However, relatively large amounts of such additives (often about 30% by weight) are required, and this can have a detrimental effect on other properties of the paint. For instance, quartz itself can cause yellowing of the paint; other problems include sedimentation of the additive during storage, an undesirable roughness in the dried paint, and also a reduction in flexibility of the dried paint. Thus there is a need for a means of reducing the degree of cracking during drying of fast drying paint which does not require the addition of large quantities of particulate additives.

EP-A-0 525 977 discloses a waterborne paint which is fast drying.

JP 8235144 discloses the use of glass fibre and asbestos in a slow drying paint to improve resistance to weather, water and abrasion after it has dried. JP 63179978 and JP 63170478 also disclose the use of glass fibre in slow drying paint to improve its durability after it has dried.

The aim of the present invention is to provide a means for reducing the degree of cracking during drying of fast drying paint which does not require the addition of large quantities of particulate additives.

Accordingly, the present invention provides in one aspect a fast drying traffic paint which includes at least 0.1% by weight, based on the weight of the paint composition, of fibres. The traffic paint is preferably an aqueous acrylic traffic paint.

The fibres cause a significant reduction in the degree of cracking during drying, at levels far below those required for the above-mentioned particulate additives. The fibres are preferably flexible and preferably have an average length of at least 50 microns, more preferably from 100 to 500 microns, and it is preferred that they are present in an amount of at least 0.3% by weight. The fibres are generally synthetic: a preferred fibre is a low-density polyethylene fibre, such as that sold under the trade mark SYLOTHIX (trademark of Grace) as a thixotropic agent.

In another aspect the invention provides a method for reducing the degree of surface cracking in a fast drying traffic paint during drying, the method comprising incorporating into said paint at least 0.1% by weight, based on the weight of the paint composition, of fibres.

In a third aspect of the invention there is provided use of at least 0.1% by weight, based on the weight of the paint composition, of fibres in a fast drying paint to reduce the degree of surface cracking during drying of the paint.

It is particularly preferred to include additionally a particulate additive such as quartz or silica having a particle size of from 1 to 300 microns, preferably from 10 to 200 and more preferably from 30 to 200 microns. The amount added can be significantly less than that required for prior art compositions, thereby greatly reducing or even avoiding altogether the above-mentioned drawbacks of using large amounts of such additives. Preferably the amount included is at least 5% by weight.

EXAMPLES

The following paint formulation was prepared for evaluation of its cracking tendency during drying (names are trademarks of the companies mentioned).

| | | |
|---|---|---|
| Primal B-2706 (Rohm and Haas) | 495.0 g | Acrylic binder |
| Orotan 850 (Rohm and Haas) | 8.1 g | Dispersant |
| Triton CF 10 (Union Carbide) | 2.2 g | Wetting agent |
| Drew TG 4250 (Drew-Ameroid) | 1.2 g | Defoamer |
| Durcal 5 (Omya) | 291.0 g | Calcium carbonate 5 microns |
| Durcal 40 (Omya) | 500.0 g | Calcium carbonate 40 microns |
| Titan TR 92 (Tioxide) | 271.0 g | $TiO_2$ pigment |
| Water | 45.2 g | |
| The above components were mixed for 20 minutes, and then the following added: | | |
| Ethanol | 26.5 g | |
| Texanol (Eastman) | 26.5 g | Coalescent |
| Drew TG 4250 (Drew-Ameroid) | 1.2 g | Defoamer |
| Water | 55.9 g | |
| TOTAL | 1723.8 g | |

Primal(R) E-2706 is a polymeric acrylic emulsion polymer. Orotan(R) 850 is a sodium salt of a polymeric carboxylic acid. Triton(R) CF10 is an alkylaryl polyether. Drew TG 4250 is a proprietary defoamer. Texanol(R) is 2,2,4-trimethylpentanediol-1,3-monoisobutyrate.

Example 1

The above paint was applied to a substrate at a wet film thickness of 600–700 microns, and the degree of cracking upon drying observed. On a scale of 1 to 10, with 10 being best (i.e. no cracks), this paint was rated 2: in other words, there was considerable cracking on the surface.

Example 2

To the above paint formulation was added 700 g of micro glass beads, having a diameter of from 1 to 45 microns. After drying, this paint was rated 9.

Example 3

To the above formulation was added 700 g of quartz having an average particle size of 90 microns. After drying, this paint was rated 9.

Although Examples 2 and 3 above effectively solve the problem of cracking, as explained above the large proportion of particulate additive required produces other detrimental effects.

Example 4

To the above formulation was added 10 g of SYLOTHIX 52 (Grace), a polyethylene-based low density fibre having an average fibre length of 400 microns. After drying, this paint was rated 7–8.

Example 5

Example 4 was repeated, except that additionally 200 g of quartz was added to the formulation. After drying, this paint was rated 9.

We claim:

1. A method for reducing the degree of surface cracking in a fast drying aqueous traffic paint during drying, the method comprising incorporating into the aqueous paint at least 0.1% by weight, based on the weight of the paint composition, of synthetic fibres having an average length of from a 50 microns to 500 microns, wherein the aqueous paint applied thicker when wet than about 450 microns has a dry-through time of less than 120 minutes when the claimatic conditions are 23 C. no air flow, and 90% relative humidity.

* * * * *